United States Patent
Hunter et al.

(10) Patent No.: US 8,112,311 B2
(45) Date of Patent: Feb. 7, 2012

(54) SYSTEMS AND METHODS FOR DISTRIBUTION OF ENTERTAINMENT AND ADVERTISING CONTENT

(75) Inventors: Charles E. Hunter, Hilton Head, SC (US); Bernard L. Ballou, Jr., Raleigh, NC (US); John H. Hebrank, Durham, NC (US)

(73) Assignee: Ochoa Optics LLC, Las Vegas, NV (US)

( * ) Notice: Subject to any disclaimer, the term of this patent is extended or adjusted under 35 U.S.C. 154(b) by 2423 days.

(21) Appl. No.: 10/035,172

(22) Filed: Jan. 4, 2002

(65) Prior Publication Data

US 2002/0124251 A1 Sep. 5, 2002

Related U.S. Application Data

(63) Continuation-in-part of application No. 09/781,679, filed on Feb. 12, 2001, now abandoned, and a continuation-in-part of application No. 09/781,680, filed on Feb. 12, 2001, now abandoned.

(60) Provisional application No. 60/326,563, filed on Oct. 2, 2001, provisional application No. 60/322,187, filed on Sep. 14, 2001, provisional application No. 60/328,606, filed on Oct. 11, 2001, provisional application No. 60/322,186, filed on Sep. 14, 2001, provisional application No. 60/325,888, filed on Sep. 28, 2001, provisional application No. 60/347,440, filed on Nov. 7, 2001.

(51) Int. Cl.
*G06Q 30/00* (2006.01)
*G06F 3/00* (2006.01)
*H04N 7/10* (2006.01)
*H04N 9/80* (2006.01)

(52) U.S. Cl. ............... 705/14.71; 705/14.19; 705/14.53; 705/14.58; 705/14.66; 705/14.67; 705/14.72; 725/42; 725/34; 725/36; 386/241; 386/249; 386/250

(58) Field of Classification Search ............... 725/42, 725/34, 36; 705/14.71, 14.49, 14.53, 14.58, 705/14.66, 14.67, 14.72; 386/241, 249, 250
See application file for complete search history.

(56) References Cited

U.S. PATENT DOCUMENTS 3,373,517 A 3/1968 Halperin
(Continued)

FOREIGN PATENT DOCUMENTS
EP 0 683 943 B1 11/1993
(Continued)

OTHER PUBLICATIONS

Tsuchiya et al., High Density Digital Videodisc Using 635 nm Laser Diode, Aug. 1994, IEEE.*

(Continued)

*Primary Examiner* — Hoang-Vu A Nguyen-Ba
(74) *Attorney, Agent, or Firm* — Woodcock Washburn LLP

(57) ABSTRACT

A device for generating audiovisual display signals, including a first input terminal receiving content signals representative of an audiovisual event, the signals including insertion points indicating the output of an advertisement, a second input terminal receiving ad signals representative of an advertisement, a first buffer storing the ad signals, and a processor converting the content signals into display signals of the event and converting ad signals stored in the first buffer into display signals of an advertisement upon detection of an insertion point.

32 Claims, 5 Drawing Sheets

U.S. PATENT DOCUMENTS

| | | | |
|---|---|---|---|
| 3,376,465 A | 4/1968 | Corpew | |
| 3,848,193 A | 11/1974 | Martin et al. | |
| 3,941,926 A | 3/1976 | Slobodzian et al. | |
| 3,983,317 A | 9/1976 | Glorioso | |
| 3,993,955 A | 11/1976 | Belcher et al. | 325/308 |
| 4,071,857 A | 1/1978 | Whitney et al. | |
| 4,094,010 A | 6/1978 | Pepperl et al. | |
| 4,155,042 A | 5/1979 | Permut et al. | |
| 4,332,022 A | 5/1982 | Ceshkovsky et al. | |
| 4,368,485 A | 1/1983 | Midland | |
| 4,476,488 A | 10/1984 | Merrell | |
| 4,536,791 A | 8/1985 | Campbell et al. | |
| 4,554,584 A * | 11/1985 | Elam et al. | 725/28 |
| 4,559,480 A | 12/1985 | Nobs | |
| 4,575,750 A | 3/1986 | Callahan | |
| 4,595,950 A | 6/1986 | Lofberg | |
| 4,613,901 A | 9/1986 | Gilhousen et al. | |
| 4,654,482 A | 3/1987 | DeAngelis | |
| 4,716,410 A | 12/1987 | Nozaki | |
| 4,734,779 A | 3/1988 | Levis et al. | |
| 4,734,858 A | 3/1988 | Schlafly | |
| 4,761,641 A | 8/1988 | Schreiber | |
| 4,766,581 A | 8/1988 | Korn et al. | |
| 4,789,863 A | 12/1988 | Bush | 340/5.9 |
| 4,794,465 A | 12/1988 | Van Luyt et al. | 386/100 |
| 4,797,913 A | 1/1989 | Kaplan et al. | |
| 4,809,325 A | 2/1989 | Hayashi et al. | 380/234 |
| 4,812,843 A | 3/1989 | Champion, III et al. | |
| 4,829,569 A | 5/1989 | Seth-Smith et al. | |
| 4,845,700 A | 7/1989 | Koizumi et al. | |
| 4,847,825 A | 7/1989 | Levine | |
| 4,862,268 A | 8/1989 | Campbell et al. | |
| 4,908,713 A | 3/1990 | Levine | |
| 4,949,187 A | 8/1990 | Cohen | |
| 5,046,090 A | 9/1991 | Walker et al. | |
| 5,051,822 A | 9/1991 | Rhoades | |
| 5,073,925 A | 12/1991 | Nagata et al. | |
| 5,105,418 A | 4/1992 | Kenmotsu et al. | |
| 5,107,107 A | 4/1992 | Osborne | |
| 5,121,430 A | 6/1992 | Ganzer et al. | |
| 5,123,046 A | 6/1992 | Levine | |
| 5,133,079 A | 7/1992 | Ballantyne et al. | |
| 5,182,669 A | 1/1993 | Chikuma et al. | |
| 5,191,573 A | 3/1993 | Hair | |
| 5,214,793 A | 5/1993 | Conway et al. | |
| 5,233,423 A | 8/1993 | Jernigan et al. | |
| 5,235,587 A | 8/1993 | Bearden et al. | |
| 5,251,193 A | 10/1993 | Nelson et al. | |
| 5,257,017 A | 10/1993 | Jones et al. | |
| 5,260,778 A | 11/1993 | Kauffman et al. | |
| 5,274,762 A | 12/1993 | Peterson et al. | |
| 5,283,731 A | 2/1994 | LaLonde et al. | |
| 5,292,568 A | 3/1994 | Tezuka et al. | |
| 5,297,204 A | 3/1994 | Levine | |
| 5,311,423 A | 5/1994 | Clark | |
| 5,319,735 A | 6/1994 | Preuss et al. | |
| 5,355,302 A | 10/1994 | Martin et al. | |
| 5,365,282 A | 11/1994 | Levine | |
| 5,373,330 A | 12/1994 | Levine | |
| 5,387,942 A * | 2/1995 | Lemelson | 725/28 |
| 5,410,344 A | 4/1995 | Graves et al. | |
| 5,414,756 A | 5/1995 | Levine | |
| 5,418,713 A | 5/1995 | Allen | |
| 5,420,647 A | 5/1995 | Levine | |
| 5,420,923 A | 5/1995 | Beyers, II et al. | |
| 5,428,606 A | 6/1995 | Moskowitz | |
| 5,438,355 A | 8/1995 | Palmer | 725/110 |
| 5,440,334 A | 8/1995 | Walters et al. | 725/92 |
| 5,465,291 A | 11/1995 | Barrus et al. | |
| 5,469,020 A | 11/1995 | Herrick | |
| 5,469,206 A | 11/1995 | Strubbe et al. | 725/60 |
| 5,473,584 A | 12/1995 | Oshima | |
| 5,483,278 A | 1/1996 | Strubbe et al. | 725/61 |
| 5,483,535 A | 1/1996 | McMillen et al. | 370/452 |
| 5,486,819 A | 1/1996 | Horie | |
| 5,495,283 A | 2/1996 | Cowe | |
| 5,497,186 A | 3/1996 | Kawasaki | |
| 5,497,479 A | 3/1996 | Hornbuckle | |
| 5,508,815 A | 4/1996 | Levine | |
| 5,512,935 A | 4/1996 | Majeti et al. | |
| 5,513,260 A | 4/1996 | Ryan | |
| 5,530,751 A | 6/1996 | Morris | |
| 5,532,920 A | 7/1996 | Hartrick et al. | |
| 5,543,856 A | 8/1996 | Rosser et al. | |
| 5,545,454 A | 8/1996 | Yamada et al. | |
| 5,550,863 A | 8/1996 | Yurt et al. | 375/240 |
| 5,557,541 A | 9/1996 | Schulhof et al. | |
| 5,559,549 A | 9/1996 | Hendricks et al. | |
| 5,565,909 A | 10/1996 | Thibadeau et al. | |
| 5,566,315 A | 10/1996 | Milillo et al. | 711/113 |
| 5,568,272 A | 10/1996 | Levine | |
| 5,572,442 A | 11/1996 | Schulhof et al. | 709/219 |
| 5,592,511 A | 1/1997 | Schoen et al. | |
| 5,592,551 A | 1/1997 | Lett et al. | |
| 5,592,626 A | 1/1997 | Papadimitriou et al. | |
| 5,598,397 A * | 1/1997 | Sim | 720/682 |
| 5,600,839 A | 2/1997 | MacDonald | |
| 5,610,653 A | 3/1997 | Abecassis | 348/170 |
| 5,612,741 A | 3/1997 | Loban et al. | |
| 5,619,247 A | 4/1997 | Russo | |
| 5,621,840 A | 4/1997 | Kawamura et al. | 386/68 |
| 5,621,863 A | 4/1997 | Boulet et al. | |
| 5,627,895 A | 5/1997 | Owaki | |
| 5,628,050 A | 5/1997 | McGraw et al. | |
| 5,630,067 A | 5/1997 | Kindell et al. | |
| 5,638,113 A | 6/1997 | Lappington et al. | |
| 5,640,453 A | 6/1997 | Schuchman et al. | |
| 5,644,859 A | 7/1997 | Hsu | |
| 5,646,603 A | 7/1997 | Nagata et al. | |
| 5,646,997 A | 7/1997 | Barton | |
| 5,654,747 A | 8/1997 | Ottesen et al. | |
| 5,659,366 A | 8/1997 | Kerman | |
| 5,659,613 A | 8/1997 | Copeland et al. | |
| 5,661,516 A | 8/1997 | Carles | |
| 5,664,018 A | 9/1997 | Leighton | |
| 5,675,734 A | 10/1997 | Hair | |
| 5,682,206 A | 10/1997 | Wehmeyer et al. | 725/58 |
| 5,684,918 A | 11/1997 | Abecassis | |
| 5,686,954 A | 11/1997 | Yoshinobu et al. | |
| 5,689,799 A | 11/1997 | Dougherty et al. | |
| 5,692,214 A | 11/1997 | Levine | |
| 5,701,161 A | 12/1997 | Williams | |
| 5,701,383 A | 12/1997 | Russo et al. | |
| 5,701,397 A | 12/1997 | Steimle et al. | |
| 5,710,869 A | 1/1998 | Godefray et al. | |
| 5,717,814 A | 2/1998 | Abecassis | |
| 5,717,832 A | 2/1998 | Steimle et al. | |
| 5,721,827 A | 2/1998 | Logan et al. | |
| 5,721,951 A | 2/1998 | DorEl | |
| 5,724,062 A | 3/1998 | Hunter | |
| 5,724,091 A | 3/1998 | Freeman et al. | |
| 5,724,525 A | 3/1998 | Beyers, II et al. | |
| 5,729,214 A | 3/1998 | Moore | 340/905 |
| 5,734,413 A | 3/1998 | Lappington et al. | 348/12 |
| 5,734,720 A | 3/1998 | Salganicoff | 380/211 |
| 5,734,781 A | 3/1998 | Cantone | 386/46 |
| 5,740,326 A | 4/1998 | Boulet et al. | |
| 5,748,716 A | 5/1998 | Levine | |
| 5,758,257 A | 5/1998 | Herz et al. | |
| 5,760,820 A | 6/1998 | Eda et al. | |
| 5,761,606 A | 6/1998 | Wolzien | 455/6.2 |
| 5,761,721 A | 6/1998 | Baldus et al. | 711/141 |
| 5,771,334 A | 6/1998 | Yamauchi et al. | |
| 5,781,734 A | 7/1998 | Ohno et al. | |
| 5,790,202 A | 8/1998 | Kummer et al. | |
| 5,790,935 A | 8/1998 | Payton | 422/186 |
| 5,790,937 A | 8/1998 | Gutle | |
| 5,799,285 A | 8/1998 | Klingman | |
| 5,805,154 A | 9/1998 | Brown | |
| 5,805,763 A | 9/1998 | Lawler et al. | |
| 5,809,139 A | 9/1998 | Girod et al. | |
| 5,815,484 A | 9/1998 | Smith et al. | |
| 5,815,662 A | 9/1998 | Ong | 725/92 |
| 5,818,806 A | 10/1998 | Wong et al. | |
| 5,822,291 A | 10/1998 | Brindze et al. | 369/94 |
| 5,822,432 A | 10/1998 | Moskowitz et al. | |
| 5,825,407 A | 10/1998 | Cowe et al. | |

| Patent No. | Kind | Date | Inventor(s) | Class |
|---|---|---|---|---|
| 5,826,123 | A | 10/1998 | Lai | 396/446 |
| 5,828,402 | A * | 10/1998 | Collings | 725/28 |
| RE35,954 | E | 11/1998 | Levine | 380/10 |
| 5,832,287 | A | 11/1998 | Atalla | |
| 5,835,896 | A * | 11/1998 | Fisher et al. | 705/37 |
| 5,841,979 | A | 11/1998 | Schulhof et al. | |
| 5,845,083 | A | 12/1998 | Hamadani et al. | |
| 5,848,129 | A | 12/1998 | Baker | |
| 5,848,155 | A | 12/1998 | Cox | |
| 5,848,352 | A | 12/1998 | Dougherty et al. | |
| 5,854,779 | A | 12/1998 | Johnson et al. | |
| 5,857,020 | A | 1/1999 | Peterson, Jr. | 705/52 |
| 5,860,068 | A | 1/1999 | Cook | |
| 5,862,260 | A | 1/1999 | Rhoads | 382/232 |
| 5,870,717 | A | 2/1999 | Wiecha | |
| 5,874,985 | A | 2/1999 | Matthews, III | |
| 5,878,017 | A * | 3/1999 | Ikegame | 720/674 |
| 5,884,284 | A | 3/1999 | Peters et al. | 705/30 |
| 5,889,868 | A | 3/1999 | Moskowitz et al. | |
| 5,890,136 | A | 3/1999 | Kipp | |
| 5,897,622 | A | 4/1999 | Blinn et al. | |
| 5,898,384 | A | 4/1999 | Alt et al. | |
| 5,899,980 | A | 5/1999 | Wilf et al. | |
| 5,903,262 | A * | 5/1999 | Ichihashi et al. | 725/136 |
| 5,903,878 | A | 5/1999 | Talati et al. | |
| 5,905,713 | A | 5/1999 | Anderson et al. | 370/241 |
| 5,905,800 | A | 5/1999 | Moskowitz et al. | |
| 5,909,492 | A | 6/1999 | Payne et al. | |
| 5,914,712 | A | 6/1999 | Sartain et al. | |
| 5,914,774 | A * | 6/1999 | Ota | 355/55 |
| 5,915,018 | A | 6/1999 | Aucsmith | 380/201 |
| 5,915,027 | A | 6/1999 | Cox et al. | |
| 5,915,068 | A | 6/1999 | Levine | |
| 5,918,213 | A | 6/1999 | Bernard et al. | |
| 5,930,369 | A | 7/1999 | Cox et al. | |
| 5,931,901 | A | 8/1999 | Wolfe et al. | 709/206 |
| 5,933,499 | A | 8/1999 | Enari | |
| 5,933,798 | A | 8/1999 | Linnartz | |
| 5,934,795 | A | 8/1999 | Rykowski et al. | |
| 5,940,135 | A | 8/1999 | Petrovic et al. | |
| 5,940,807 | A | 8/1999 | Purcell | |
| 5,943,670 | A | 8/1999 | Prager | |
| 5,946,665 | A | 8/1999 | Suzuki et al. | |
| 5,949,885 | A | 9/1999 | Leighton | |
| 5,956,716 | A | 9/1999 | Kenner et al. | 707/10 |
| 5,959,885 | A | 9/1999 | Rao | 365/185.07 |
| 5,959,945 | A | 9/1999 | Kleiman et al. | |
| 5,960,081 | A | 9/1999 | Vynne et al. | |
| 5,960,411 | A | 9/1999 | Hartman et al. | |
| 5,963,217 | A | 10/1999 | Grayson et al. | 345/473 |
| 5,963,264 | A | 10/1999 | Jackson | |
| 5,963,915 | A | 10/1999 | Kirsch | |
| 5,963,917 | A | 10/1999 | Ogram | |
| 5,966,440 | A | 10/1999 | Hair | |
| 5,966,697 | A | 10/1999 | Fergerson et al. | |
| 5,969,283 | A | 10/1999 | Looney et al. | |
| 5,969,715 | A | 10/1999 | Dougherty et al. | |
| 5,970,471 | A | 10/1999 | Hill | |
| 5,970,472 | A | 10/1999 | Alsop et al. | |
| 5,970,473 | A | 10/1999 | Gerszberg et al. | |
| 5,970,474 | A | 10/1999 | Leroy et al. | |
| 5,970,475 | A | 10/1999 | Barnes et al. | |
| 5,974,396 | A | 10/1999 | Anderson et al. | |
| 5,978,775 | A | 11/1999 | Chen | |
| 5,983,199 | A | 11/1999 | Kaneko | |
| 5,983,200 | A | 11/1999 | Slotznick | |
| 5,983,201 | A | 11/1999 | Fay | |
| 5,988,078 | A | 11/1999 | Levine | |
| 5,991,399 | A | 11/1999 | Graunke et al. | 380/4 |
| 5,992,888 | A | 11/1999 | North et al. | |
| 6,002,772 | A | 12/1999 | Saito | |
| 6,005,938 | A | 12/1999 | Banker et al. | 380/239 |
| 6,006,332 | A | 12/1999 | Rabne et al. | 713/201 |
| 6,011,722 | A | 1/2000 | Bude et al. | |
| 6,012,086 | A | 1/2000 | Lowell | 709/218 |
| 6,013,007 | A | 1/2000 | Root et al. | |
| 6,014,491 | A | 1/2000 | Hair | |
| 6,023,451 | A | 2/2000 | Kashiwagi et al. | |
| 6,025,868 | A | 2/2000 | Russo | |
| 6,029,045 | A * | 2/2000 | Picco et al. | 725/34 |
| 6,029,141 | A | 2/2000 | Bezos et al. | 725/27 |
| 6,032,130 | A | 2/2000 | Alloul et al. | 705/27 |
| 6,044,047 | A | 3/2000 | Kulas | 369/34.01 |
| 6,052,554 | A | 4/2000 | Hendricks et al. | |
| 6,061,440 | A | 5/2000 | Delaney et al. | 379/202.01 |
| 6,064,980 | A | 5/2000 | Jacobi et al. | 705/26 |
| 6,067,107 | A | 5/2000 | Travaille et al. | |
| 6,067,532 | A | 5/2000 | Gebb | |
| 6,069,868 | A | 5/2000 | Kashiwagi | 369/275.1 |
| 6,072,982 | A | 6/2000 | Haddad | |
| 6,073,372 | A | 6/2000 | Davis | |
| 6,081,785 | A | 6/2000 | Oshima et al. | 705/1 |
| 6,088,455 | A | 7/2000 | Logan et al. | 380/200 |
| 6,088,722 | A | 7/2000 | Herz et al. | 709/217 |
| 6,091,883 | A | 7/2000 | Artigalas et al. | |
| 6,115,348 | A | 9/2000 | Guerra | 369/112 |
| 6,118,976 | A | 9/2000 | Arias et al. | |
| 6,119,096 | A | 9/2000 | Mann et al. | 705/5 |
| 6,122,403 | A | 9/2000 | Rhoads | |
| 6,131,130 | A | 10/2000 | Van Ryzin | |
| 6,141,530 | A | 10/2000 | Rabowsky | 725/116 |
| 6,147,715 | A | 11/2000 | Yuen et al. | 348/565 |
| 6,148,142 | A | 11/2000 | Anderson | |
| 6,148,428 | A | 11/2000 | Welch et al. | 714/752 |
| 6,150,964 | A | 11/2000 | McLaughlin | |
| 6,151,600 | A | 11/2000 | Dedrick | 707/10 |
| 6,175,840 | B1 | 1/2001 | Chen et al. | 707/501.1 |
| 6,177,931 | B1 * | 1/2001 | Alexander et al. | 725/52 |
| 6,198,875 | B1 | 3/2001 | Edenson et al. | 386/94 |
| 6,201,777 | B1 | 3/2001 | Tsuchiya et al. | |
| 6,209,787 | B1 | 4/2001 | Iida | 235/381 |
| 6,226,618 | B1 | 5/2001 | Downs et al. | 705/1 |
| 6,228,440 | B1 | 5/2001 | Dailey et al. | |
| 6,229,453 | B1 | 5/2001 | Gardner et al. | 340/853.8 |
| 6,233,389 | B1 | 5/2001 | Barton et al. | |
| 6,233,682 | B1 | 5/2001 | Fritsch | |
| 6,240,401 | B1 | 5/2001 | Oren et al. | |
| 6,247,130 | B1 | 6/2001 | Fritsch | 713/171 |
| 6,249,532 | B1 | 6/2001 | Yoshikawa et al. | 370/486 |
| 6,265,424 | B1 | 7/2001 | Tisdell et al. | 546/272.4 |
| 6,269,394 | B1 | 7/2001 | Kenner et al. | 709/217 |
| 6,272,636 | B1 | 8/2001 | Neville et al. | 713/189 |
| 6,288,753 | B1 | 9/2001 | DeNicola et al. | |
| 6,363,356 | B1 | 3/2002 | Horstmann | 705/26 |
| 6,385,596 | B1 | 5/2002 | Wiser et al. | 705/51 |
| 6,400,996 | B1 | 6/2002 | Hoffberg et al. | 700/83 |
| 6,405,203 | B1 | 6/2002 | Collart | 707/10 |
| 6,408,313 | B1 | 6/2002 | Campbell et al. | 707/205 |
| 6,424,998 | B2 | 7/2002 | Hunter | 709/207 |
| 6,430,603 | B2 | 8/2002 | Hunter | 709/207 |
| 6,430,605 | B2 | 8/2002 | Hunter | 709/207 |
| 6,438,579 | B1 | 8/2002 | Hosken | 709/203 |
| 6,453,420 | B1 | 9/2002 | Collart | 726/26 |
| 6,463,467 | B1 | 10/2002 | Mages et al. | 709/218 |
| 6,496,822 | B2 | 12/2002 | Rosenfelt et al. | 707/9 |
| 6,504,798 | B1 | 1/2003 | Revis | 369/30.23 |
| 6,519,341 | B1 | 2/2003 | Enari | 380/217 |
| 6,519,571 | B1 | 2/2003 | Guheen et al. | |
| 6,522,769 | B1 | 2/2003 | Rhoads et al. | 382/100 |
| 6,529,526 | B1 | 3/2003 | Schneidewend | |
| 6,574,424 | B1 | 6/2003 | Dimitri et al. | |
| 6,606,744 | B1 | 8/2003 | Mikurak | 717/174 |
| 6,611,820 | B2 | 8/2003 | Oshima et al. | 705/56 |
| 6,621,933 | B2 | 9/2003 | Chung et al. | 382/233 |
| 6,625,333 | B1 | 9/2003 | Wang et al. | 382/300 |
| 6,637,029 | B1 | 10/2003 | Maissel et al. | |
| 6,641,886 | B1 | 11/2003 | Bakos et al. | |
| 6,647,417 | B1 | 11/2003 | Hunter et al. | |
| 6,697,948 | B1 | 2/2004 | Rabin et al. | 726/30 |
| 6,698,020 | B1 * | 2/2004 | Zigmond et al. | 725/34 |
| 6,718,551 | B1 | 4/2004 | Swix et al. | 725/32 |
| 6,728,271 | B1 | 4/2004 | Kawamura et al. | |
| 6,728,713 | B1 | 4/2004 | Beach et al. | 707/10 |
| 6,732,366 | B1 | 5/2004 | Russo | 725/5 |
| 6,735,251 | B2 | 5/2004 | Sugahara | 375/240.01 |
| 6,756,997 | B1 * | 6/2004 | Ward et al. | 715/716 |
| 6,772,331 | B1 | 8/2004 | Hind et al. | |
| 6,778,678 | B1 | 8/2004 | Podilchuk et al. | |

| | | |
|---|---|---|
| 6,799,326 B2 * | 9/2004 | Boylan et al. ............... 725/35 |
| 6,829,301 B1 | 12/2004 | Tinker et al. ............ 375/240.12 |
| 6,842,522 B1 | 1/2005 | Downing |
| 6,850,901 B1 | 2/2005 | Sykes et al. ............... 705/26 |
| 6,881,465 B2 | 4/2005 | Ogawa et al. |
| 6,889,383 B1 | 5/2005 | Jarman |
| 6,928,423 B1 | 8/2005 | Yamanaka ............ 705/50 |
| 6,931,534 B1 | 8/2005 | Jandel et al. |
| 6,931,657 B1 | 8/2005 | Marsh ............... 725/46 |
| 6,948,070 B1 | 9/2005 | Ginter et al. .......... 713/193 |
| 6,952,685 B1 | 10/2005 | Hunter et al. |
| 6,956,833 B1 | 10/2005 | Yukie et al. ............ 370/328 |
| 7,006,974 B2 | 2/2006 | Burchard et al. |
| 7,032,237 B2 | 4/2006 | Tsunoda et al. |
| 7,047,302 B1 | 5/2006 | Chatani et al. |
| 7,120,800 B2 | 10/2006 | Ginter et al. .......... 713/193 |
| 7,130,892 B2 | 10/2006 | Mukai ............... 705/26 |
| 7,155,733 B2 | 12/2006 | Rodriguez et al. |
| 7,197,758 B1 | 3/2007 | Blackketter et al. |
| 7,209,900 B2 | 4/2007 | Hunter et al. |
| 7,233,781 B2 | 6/2007 | Hunter et al. ............ 455/404.1 |
| 7,263,188 B2 | 8/2007 | Kohno .............. 380/231 |
| 7,269,634 B2 | 9/2007 | Getsin et al. |
| 7,313,802 B1 * | 12/2007 | Tomsen ............ 725/23 |
| 7,370,016 B1 | 5/2008 | Hunter et al. |
| 2001/0002852 A1 | 6/2001 | Kwoh |
| 2001/0003846 A1 | 6/2001 | Rowe et al. |
| 2001/0005906 A1 | 6/2001 | Humpleman |
| 2001/0010045 A1 | 7/2001 | Stefik et al. |
| 2001/0010095 A1 | 7/2001 | Ellis et al. |
| 2001/0013037 A1 | 8/2001 | Matsumoto |
| 2001/0013120 A1 | 8/2001 | Tsukamoto |
| 2001/0014882 A1 | 8/2001 | Stefik et al. |
| 2001/0016836 A1 | 8/2001 | Boccon Gibod et al. |
| 2001/0017920 A1 | 8/2001 | Son et al. |
| 2001/0018742 A1 | 8/2001 | Hirai |
| 2001/0018858 A1 | 9/2001 | Dwek |
| 2001/0023416 A1 | 9/2001 | Hosokawa |
| 2001/0023417 A1 | 9/2001 | Stefik et al. |
| 2001/0023428 A1 | 9/2001 | Miyazaki et al. |
| 2001/0024425 A1 | 9/2001 | Tsunoda et al. |
| 2001/0024566 A1 | 9/2001 | Mankowitz |
| 2001/0025259 A1 | 9/2001 | Rouchon |
| 2001/0025269 A1 | 9/2001 | Otsuka |
| 2001/0025316 A1 | 9/2001 | Oh |
| 2001/0027561 A1 | 10/2001 | White et al. |
| 2001/0027563 A1 | 10/2001 | White et al. |
| 2001/0029491 A1 | 10/2001 | Yoneta et al. |
| 2001/0029538 A1 | 10/2001 | Blockton et al. |
| 2001/0029583 A1 | 10/2001 | Palatov et al. |
| 2001/0030660 A1 | 10/2001 | Zainouiline |
| 2001/0031066 A1 | 10/2001 | Meyer et al. |
| 2001/0032131 A1 | 10/2001 | Mowry |
| 2001/0032132 A1 | 10/2001 | Moran |
| 2001/0032133 A1 | 10/2001 | Moran |
| 2001/0032187 A1 | 10/2001 | Nuttall |
| 2001/0032312 A1 | 10/2001 | Runje et al. |
| 2001/0034635 A1 | 10/2001 | Winters |
| 2001/0034714 A1 | 10/2001 | Terao et al. |
| 2001/0034883 A1 | 10/2001 | Zigmond |
| 2001/0037465 A1 | 11/2001 | Hart et al. |
| 2001/0042043 A1 | 11/2001 | Shear et al. ............ 705/51 |
| 2001/0047298 A1 | 11/2001 | Moore et al. ............ 705/14 |
| 2002/0028024 A1 | 3/2002 | Jayant et al. |
| 2002/0056112 A1 | 5/2002 | Dureau et al. .......... 725/78 |
| 2002/0056118 A1 | 5/2002 | Hunter et al. .......... 725/87 |
| 2002/0066025 A1 | 5/2002 | Sato et al. ............ 713/200 |
| 2002/0095357 A1 | 7/2002 | Hunter et al. .......... 705/27 |
| 2002/0100043 A1 | 7/2002 | Lowthert et al. ............ 725/36 |
| 2002/0103699 A1 | 8/2002 | Figueiras Ferreiro |
| 2002/0112235 A1 | 8/2002 | Ballou et al. |
| 2002/0112243 A1 | 8/2002 | Hunter et al. |
| 2002/0116313 A1 * | 8/2002 | Detering ............... 705/37 |
| 2002/0120925 A1 * | 8/2002 | Logan ............... 725/9 |
| 2002/0124251 A1 | 9/2002 | Hunter et al. |
| 2002/0184047 A1 * | 12/2002 | Plotnick et al. .......... 705/1 |
| 2003/0004796 A1 | 1/2003 | Struble |
| 2003/0028888 A1 | 2/2003 | Hunter et al. |
| 2003/0061607 A1 | 3/2003 | Hunter et al. .......... 725/32 |

| | | |
|---|---|---|
| 2003/0067554 A1 * | 4/2003 | Klarfeld et al. ............ 348/461 |
| 2003/0133692 A1 | 7/2003 | Hunter et al. |
| 2004/0083492 A1 | 4/2004 | Goode et al. ............ 725/87 |
| 2004/0103439 A1 | 5/2004 | Macrae et al. ............ 725/109 |
| 2005/0010949 A1 | 1/2005 | Ward et al. .......... 725/42 |
| 2005/0097599 A1 * | 5/2005 | Plotnick et al. .......... 725/32 |
| 2005/0182730 A1 | 8/2005 | Hunter et al. .......... 705/58 |
| 2006/0195548 A1 | 8/2006 | Hunter et al. .......... 709/217 |
| 2006/0212892 A1 | 9/2006 | Hunter et al. .......... 725/87 |
| 2006/0212908 A1 | 9/2006 | Hunter et al. .......... 725/86 |
| 2006/0229904 A1 | 10/2006 | Hunter et al. .......... 705/52 |
| 2006/0294016 A1 | 12/2006 | Hunter et al. .......... 705/51 |
| 2007/0028276 A1 | 2/2007 | Inoue et al. |
| 2007/0110240 A1 | 5/2007 | Moskowitz et al. |
| 2007/0186272 A1 | 8/2007 | Hunter et al. .......... 725/87 |
| 2007/0276740 A1 | 11/2007 | Hunter et al. |

FOREIGN PATENT DOCUMENTS

| | | |
|---|---|---|
| EP | 0 683 943 B1 | 11/1995 |
| EP | 0 756 423 A1 | 1/1997 |
| EP | 0 975 111 A2 | 7/1999 |
| EP | 0 954 176 A2 | 11/1999 |
| EP | 0 954 179 A2 | 11/1999 |
| EP | 0 975 111 A2 | 1/2000 |
| EP | 0 977 389 A2 | 2/2000 |
| EP | 0 984 631 A1 | 3/2000 |
| EP | 1 143 721 A1 | 3/2000 |
| EP | 0 994 470 A2 | 4/2000 |
| EP | 1 104 195 A2 | 5/2001 |
| EP | 1 143 721 A1 | 10/2001 |
| JP | 360253082 | 12/1985 |
| JP | 407143081 A | 6/1995 |
| JP | 410290441 | 10/1998 |
| JP | 2002015333 | 1/2002 |
| JP | 2002099283 | 4/2002 |
| JP | 2002156979 | 5/2002 |
| TW | 503657 | 8/2000 |
| TW | 90101479 | 1/2001 |
| TW | 527835 | 3/2001 |
| WO | WO 91/03112 | 3/1991 |
| WO | WO 92/22983 | 12/1992 |
| WO | WO 94/13107 | 6/1994 |
| WO | WO 96/26605 | 2/1995 |
| WO | WO 96/26605 | 8/1996 |
| WO | WO 96/34467 | 10/1996 |
| WO | WO 96/34494 | 10/1996 |
| WO | WO 96/34467 | 11/1996 |
| WO | WO 96/34494 | 11/1996 |
| WO | WO 98/26357 | 6/1998 |
| WO | WO 98/27732 | 6/1998 |
| WO | WO 99/18727 | 4/1999 |
| WO | WO 99/31842 | 6/1999 |
| WO | WO 01/01677 | 1/2000 |
| WO | WO 00/05886 | 2/2000 |
| WO | WO 00/07368 | 2/2000 |
| WO | WO 00/14965 | 3/2000 |
| WO | WO 01/17242 | 3/2001 |
| WO | WO 01/41013 | 6/2001 |
| WO | WO 01/47249 | 6/2001 |
| WO | WO 01/54324 | 7/2001 |
| WO | WO 01/54410 | 7/2001 |
| WO | WO 01/74050 | 10/2001 |
| WO | WO 01/82625 | 11/2001 |
| WO | WO 02/65750 | 8/2002 |

OTHER PUBLICATIONS

Sennaroglu et al., Generation of Tunable Femtosecond Pulses in the 1.21-1.27 um and 605-635 nm Wavelength Region by Using a regeneratively Initiated Self-Mode-Locked Cr:Forsterite Laser, Aug. 1994, IEEE.*

Connell, N., "Conference on Lasers and Electro-Optics:Perspectives on Printing, Storage and Display," 1996 Tech Digest Series, vol. 9.

Tsuchiya et al., "High Density Digital Videodics Using 635 nm Laser Diode," IEEE, Aug. 1994, 6 pages.

Sennaroglu et al., "Generation of Tunable Femtosecond Pulses in the 1.21-1.27 um and 605-635 nm Wavelength Region by Using a regenertively Initiated Self-Mode-Locked Cr: Forsterite Laser," IEEE, Aug. 1994, 11 pages.

U.S. Appl. No. 60/169,274, pp. 1-45, filed Dec. 7 1999, 109 pages.
U.S. Appl. No. 09/707,273, (filed Nov. 6, 2000), 62 pages.
"Wink Television Press Room," http://www.wink.com/contents/PressReleases.shtml, downloaded and printed on May 14, 2002.
"Wink Announces First National Advertising Partners: AT&T, Levi Strauss & Co., and GE," http://www.wink.com/contents/_PressReleases/930708938/content.shtml, downloaded and printed on May 14, 2002, dated Sep. 9, 1998.
"Wink Communications, Inc., Changes the Advertising Landscape," http://www.wink.com/contents/PressReleases/930709807/content.shtml downloaded and printed on May 14, 2002, dated Jan. 21, 1999.
"Wink's History," http://www.wink.com/contents/history.shtml, downloaded and printed on May 14, 2002.
"How Wink Works," http://www.wink.com/contents/howitworks.shtml, downloaded and printed on May 14, 2002.
"What is Wink: Examples," http://www.wink.com/contents/examples.shtml, downloaded and printed on May 14, 2002.
"The Wink System," http://www.wink.com/contents/tech_diagram.shtml, downloaded and printed on May 14, 2002.
"Wink Response Server and Wink Response Network," http://www.wink.com/contents/tech_wrs.shtml, downloaded and printed on May 14, 2002.
"ICAP and HTML (ATVEF)," http://www.wink.com/contents/tech_icap.shtml, downloaded and printed on May 14, 2002.
"Wink Studio and Wink Server Studio," http://www.wink.com/contents/tech_studio.shtml, downloaded and printed on May 14, 2002.
"Wink Broadcast Server," http://www.wink.com/contents/tech_wbs.shtml, downloaded and printed May 14, 2002.
"Wink Client Software," http://www.wink.com/contents/tech_engine.shtml downloaded and printed on May 14, 2002.
"Onsale Invoice," http://www.onsale.com/cgi-win/invoice.exe, dated Jan. 19, 1998, printed Jan. 20, 1998, (Copyright 1997).
Onsale Packing Sheet (Jason Deep Space Series 225 X 60 Astronomy Telescope), received Jul. 1999.
Egghead Packing Receipt (Franklin Rex Organizer), received Dec. 1999.
"Sell Goods to Egghead.com," http://www.egghead.com/ShowPage.dll?p.=hd_aboutus_sellgoods_ p, printed Sep. 29, 2001.
"Demographics profile," http://www.egghead.com/ShowPage.dll?page=hd_aboutus_demo_p, printed Sep. 29, 2001.
"About us," http://www.egghead.com/ShowPage.dll?page=hd_aboutus_aboutus_p , printed Sep. 29, 2001.
"Privacy and Security Policy," http://www.egghead.com/ShowPage.dll?page=hd_policy_policyandprivacy_p, printed Sep. 29, 2001.
"Registration," http://www.egghead.com/ShowPage.dll?page=reg_page1_ceos&S=1, printed Sep. 26, 2001.
"New Credit Information," https://secure.fairmarket.com/secure/Cre...FM1001, printed Sep. 26, 2001.
"Quadrant 256MB, PC133 (PC-100 Compatible), 32X64, 7ns, 168-Pin, SdRAM DIMM Module (New)," wysiwyg://253/http://auctions.egghead.com...LotNo=65659811&BatchNo=0, printed Sep. 24, 2001.
"Ashton Digital VisionGate 52 15.1' TFT-LCD, Pivot Screen, USB Hub, w/ Speakers," wysiwyg://253/http://auctions.egghead.com...LotNo=66044439, printed Sep. 26, 2001.
"Login/Logout," http://www.egghead.com/ShowPage.dII?page...44439, printed Sep. 29, 2001.
"Enter Your Bid," wysiwyg://218/http://auctions.egghead.com...5a99, printed Sep. 29, 2001.
"Enter Your Bid," https://auctions.egghead.com/scripts/...LotNo=66044439, printed Sep. 29, 2001.
"Confirm Your Bid," wysiwyg://220/http://auctions.egghead.com...ShipCountry=US, printed Sep. 29, 2001.
"Bid Receipt for Bid No. 5270411," wysiwyg://220/http://auctions.egghead.com...KioskListing=0, printed Sep. 29, 2001.
"Universal Product Code(UPC) and EAN Article Numbering Code (EAN) Page," http://www.adamsl.com/pub/russadam/upccode.html, by Russ Adams, printed Sep. 24, 2001.
"Internet Archive Way Back Machine- Searched for http://www.egghead.com," printed Apr. 8, 2002, (Copyright 2001).
"Internet Archive Way Back Machine- Searched for http://www.onsale.com," printed Apr. 8, 2002, (Copyright 2001).

"Making Digital Cinema Actually Happen- What it Takes and Who's Going to Do It.," Steven A Morley, Copyright 1998.
"Streaming Onto the Movie Screen, with Nary a Scratch," Karen J. Bannan, The New York Times, May 9, 2002, p. E5.
"Calimetrics' Multilevel Technology Enables Higher-Performance CD/DVD Recorders: An IDC White Paper," Wolfgang Schlichting, (Copyright 2000).
"DataPlay, Inc.—Universal Recording Media—Discover," http://www/dataplay.com/jsp_files/en/discover/index-music.jsp, downloaded and printed on May 14, 2002, (Copyright 2001).
"DataPlay, Inc.—Universal Recording Media—What's Playing on DataPlay," http://www/dataplay.com/servlets/ProductList?action=productSearch, downloaded and printed on May 14, 2002, (Copyright 2001).
"DataPlay, Inc.—Universal Recording Media—What's Playing on DataPlay," http://www.dataplay.com/jsp_files/en/ whatsplaying/products.jsp, downloaded and printed on May 14, 2002, (Copyright 2001).
"DataPlay, Inc.—Universal Recording Media—What'Playing on DataPlay," http://www.dataplay.com/jsp_files/en/ whatsplaying/products.jsp?action=details, downloaded and printed on May 14, 2002, (Copyright 2001).
"DataPlay, Inc.—Universal Recording Media—Industry,"http://www.dataplay.com/jsp_files/en/industry/products-digitalmedia.jsp, downloaded and printed on May 14, 2002, (Copyright 2001).
"DataPlay, Inc.—Universal Recording Media—Industry," http://www.dataplay.com/jsp_files/en/industry/products-engines.jsp, downloaded and printed on May 14, 2002 (Copyright 2001).
"DataPlay, Inc.—Universal Recording Media—Industry," http://www.dataplay.com/jsp_files/en/industry.comtentproviders.jsp, downloaded and printed on May 14, 2002, (Copyright 2001).
"DataPlay, Inc.—Universal Recording Media—Industry," http://www.dataplay.com/jsp_files/en/industry/products-contentkey.jsp, downloaded and printed on May 14, 2002, (Copyright 2001).
"DataPlay, Inc.—Universal Recording Media—Industry," http://www.dataplay.com/jsp_files/en/industry/index.jsp, downloaded and printed on May 14, 2002, (Copyright 2001).
"What's Playing on DataPlay—Everything Digital," DataPlay Micro-optical Engine Product Brochure, downloaded and printed on May 14, 2002, (Copyright 2000-2002).
"What's Playing on DataPlay—Everything Digital," DataPlay Digital Media Product Brochure, downloaded and printed on May 14, 2002, (Copyright 2000-2001).
"Wink Broadcast Server," http://www.wink.com/contents/tech_wbs.shtml, downloaded and printed on May 14, 2002.
U.S. Appl. No. 09/781,679, filed Feb. 12, 2001, Bernard L. Ballou et al.
U.S. Appl. No. 09/781,680, filed Feb. 12, 2001, Bernard L. Ballou et al.
U.S. Appl. No. 10/072,471, filed Feb. 7, 2002, Hunter et al.
Charles Eric Hunter et al., filed Aug. 2, 2002 for "Systems and Methods for Providing Consumers With Entertainment Content and Associated Periodically Updated Advertising".
"About us," http://www.egghead.com/ShowPage.dll?page=hd_aboutus_aboutus_p , printed Sep. 29, 2001.
U.S. Appl. No. 09/781,679, Bernard L. Ballou et al., filed Feb. 12, 2001.
U.S. Appl. No. 09/781,680, Bernard L. Ballou et al., filed Feb. 12, 2001.
U.S. Appl. No. 10/072,471, Charles Eric Hunter et al., filed Feb. 7, 2002.
U.S. Appl. No. TBA Charles Eric Hunter et al. (filed Aug. 2, 2002) for "Systems and Methods for Providing Consumers with Entertainment Content and Associated Periodically Updated Advertising."
IBM Technical Disclosure Bulletin, "Multimedia Audio on Demand," 1994, 37, 1 page (Abstract only).
DVD—Video Format Book Specification, Version 1.11, published Mar. 1999 by Toshiba Corporation on behalf of DVD forum.
U.S. Appl. No. 09/385,671, Charles Eric Hunter, filed Aug. 27, 1999.
U.S. Appl. No. 09/476,078, Charles Eric Hunter, filed Dec. 30, 1999.
U.S. Appl. No. 09/493,854, Charles Eric Hunter et al., filed Jan. 28, 2000.

U.S. Appl. No. 09/553,524, Charles Eric Hunter et al., filed Apr. 20, 2000.

U.S. Appl. No. 09/645,087, Charles Eric Hunter et al., filed Aug. 24, 2000.

U.S. Appl. No. 09/675,025, Charles Eric Hunter et al., filed Sep. 28, 2000.

U.S. Appl. No.09/684,442, Charles Eric Hunter et al., filed Oct. 6, 2000.

U.S. Appl. No. 09/707,273, Charles Eric Hunter et al., filed Nov. 6, 2000.

U.S. Appl. No. 11/469,236, Charles Eric Hunter et al., filed Aug. 31, 2006.

U.S. Appl. No. 11/801,109, Charles Eric Hunter et al., filed May 7, 2007.

US 5,825,354, 10/1998, Ahmad et al. (withdrawn)

* cited by examiner

SYSTEMS AND METHODS FOR DISTRIBUTION OF ENTERTAINMENT AND ADVERTISING CONTENT

CROSS REFERENCE TO RELATED APPLICATIONS

This application is a Continuation-in-Part of U.S. patent application Ser. No. 09/781,679, for "Video Distribution System," filed Feb. 12, 2001, and is a Continuation-in-Part of U.S. patent application Ser. No. 09/781,680, for "Video Distribution System," filed Feb. 12, 2001, both of which are assigned to the assignee of the present application. The disclosures of the aforementioned U.S. patent applications are hereby expressly incorporated herein by reference.

This application claims the benefit under 35 U.S.C. 119(e) of U.S. Provisional Application Ser. No. 60/326,563, for "System and Method for Ultrahigh Reliability, High Density, Short Wavelength Laser Read and Write Data Storage System With Content Protection," filed Oct. 2, 2001, the contents of which are expressly incorporated herein by reference.

This application further claims the benefit under 35 U.S.C. 119(e) of U.S. Provisional Application Ser. No. 60/347,440, for "System and Method for Optically Altered DVD (DVDO™)," filed Nov. 7, 2001, the contents of which are expressly incorporated herein by reference.

This application further claims the benefit under 35 U.S.C. §119(e) of U.S. Provisional Application Ser. No. 60/322,186, for "Ultrahigh Reliability, High Density Read and Write Data Storage System," filed Sep. 14, 2001, the contents of which are expressly incorporated herein by reference.

This application further claims the benefit under 35 U.S.C. §119(e) of U.S. Provisional Application Ser. No. 60/325,888, for "System and Method for Ultrahigh Reliability, High Density, Short Wavelength Laser Read and Write Data Storage System with Content Protection," filed Sep. 28, 2001, the contents of which are expressly incorporated herein by reference.

This application further claims the benefit under 35 U.S.C. §119(e) of U.S. Provisional Application Ser. No. 60/322,187, for "System and Method for Content Delivery," filed Sep. 14, 2001.

This application further claims the benefit under 35 U.S.C. §119(e) of U.S. Provisional Application Ser. No. 60/328,606, for "System and Method for Optically Altered DVD (DVDO™)," filed Oct. 11, 2001.

FIELD

This invention relates to apparatus and methods for distributing entertainment content and advertising content and, more particularly for distributing entertainment content and advertising content tailored to a consumer.

BACKGROUND

The current size and success of the entertainment industry shows the enormous market for audio and video entertainment by consumers. The music recording industry, television and movie industries, and professional athletics, among others, have all seen large economic gains since the dawn of television and radio. In fact, the demand for such broadcast audio and visual content spawned new for a for advertising. However, current methodologies for the distribution and viewing of audio/visual content including music, movies, information, and advertising have become outdated due to substantial steps forward in technology.

Traditionally, consumers, i.e., those watching or listening to the audio/visual content, were forced to view or listen to the content as it was broadcast. Television stations followed specific schedules to let consumers know when their show, movies, information or sporting events would be broadcast. In addition, radio stations broadcast the music or shows according to their set schedules. As a result, the consumer had very little flexibility in deciding when to view their show, or listen to their music. Similarly advertisers were restricted by the schedule to broadcast their advertisements at whatever affordable, available time was most likely to include viewers interested in their products. The system was neither efficient for the advertisers nor convenient for the consumers.

As a result, techniques developed to allow the consumer to record the music or movie from the broadcast for later viewing or listening. Audio cassettes allowed for the capture of audio content. VCR's allowed the consumer to capture audio visual content. Movie rentals allowed users to rent movies for viewing at a convenient time and place. In addition, models such as those employed by TiVo® digital video recorders and Replay® digital video recorders allowed for the capture of such content for later viewing. However, these models required the viewer to know in advance the scheduled broadcast time for their show and to program a device, such as a VCR to record their shows. This required additional cost for the recording device and medium, and time to study the broadcast schedule and to program the recording device accordingly. This scheme, however, adversely impacted advertisers, as consumers watching the recorded content often fast forwarded past any advertisements.

More recently, video on demand (or audio on demand) has allowed consumers the ability to modify the schedule of the audio/visual content by simply demanding content at times convenient to the consumer. This technique suffered from two profound limitations. First, the content distributed in this scheme was easily copied and disseminated without the consent of the content providers. In addition, advertisers were further limited in their options, as they now may not even chose the broadcast time for their commercials. Instead, they were limited to transmission of the advertisements at the time demanded by the consumer.

Another limitation of current content distribution schemes is that Digital Rights Management (DRM) schemes are digitally implemented. As technology advances, the processing power available for decryption, collaborative distributed processing efforts such as those utilized to break DES (digital encryption system), have minimized the security of existing DRM models. In addition, the publication of software applications such as the DeCSS software application for cracking DVD, and the availability of unencrypted formats, render the cryptographic analysis of digital keys possible. As a result, estimates place lost revenues due to copied VHS recordings at roughly 30%. Furthermore, in emerging markets such as China, the estimates soar to nearly 80%. Estimates of the loss due to ripped CD's and DVD's are difficult to estimate presently.

It is desirable, therefore to provide a distribution scheme for delivery of audio and video content with increased security and convenience, and higher density (i.e. greater data per disc). In addition, the method should provide the ability to archive audio and video content on secure discs for consumers to view at their convenience. In addition, the method should provide the ability to better target ads to the wants and needs of the consumers who will be watching them.

SUMMARY

Consistent with the principles of the present invention, a device for generating audiovisual display signals, includes a first input terminal receiving content signals representative of an audiovisual event, the signals including insertion points indicating the integration of an advertisement, a second input terminal receiving ad signals representative of an advertisement, a first buffer storing the ad signals, and a processor converting the content signals into display signals of the event and converting ad signals stored in the first buffer into display signals of an advertisement upon detection of an insertion point.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments and together with the description, serve to explain the principles of the invention.

DETAILED DESCRIPTION

Reference will now be made in detail to exemplary embodiments, which are illustrated in the accompanying drawings. Wherever possible, the same reference numbers will, throughout the drawings, refer to the same or like parts.

A system and method provide for unrestricted distribution of content-protected discs, in a manner optimized to meet market conditions. This would include, but not be limited to, direct-to-consumer shipments, club models, and/or distribution via traditional retail outlets, or any other means of delivering physical content to a consumer. Furthermore, consistent with the present invention, advertisements may be inserted at strategic locations in the content such that advertisements may be targeted to customers based on consumer preferences.

Figure 1:
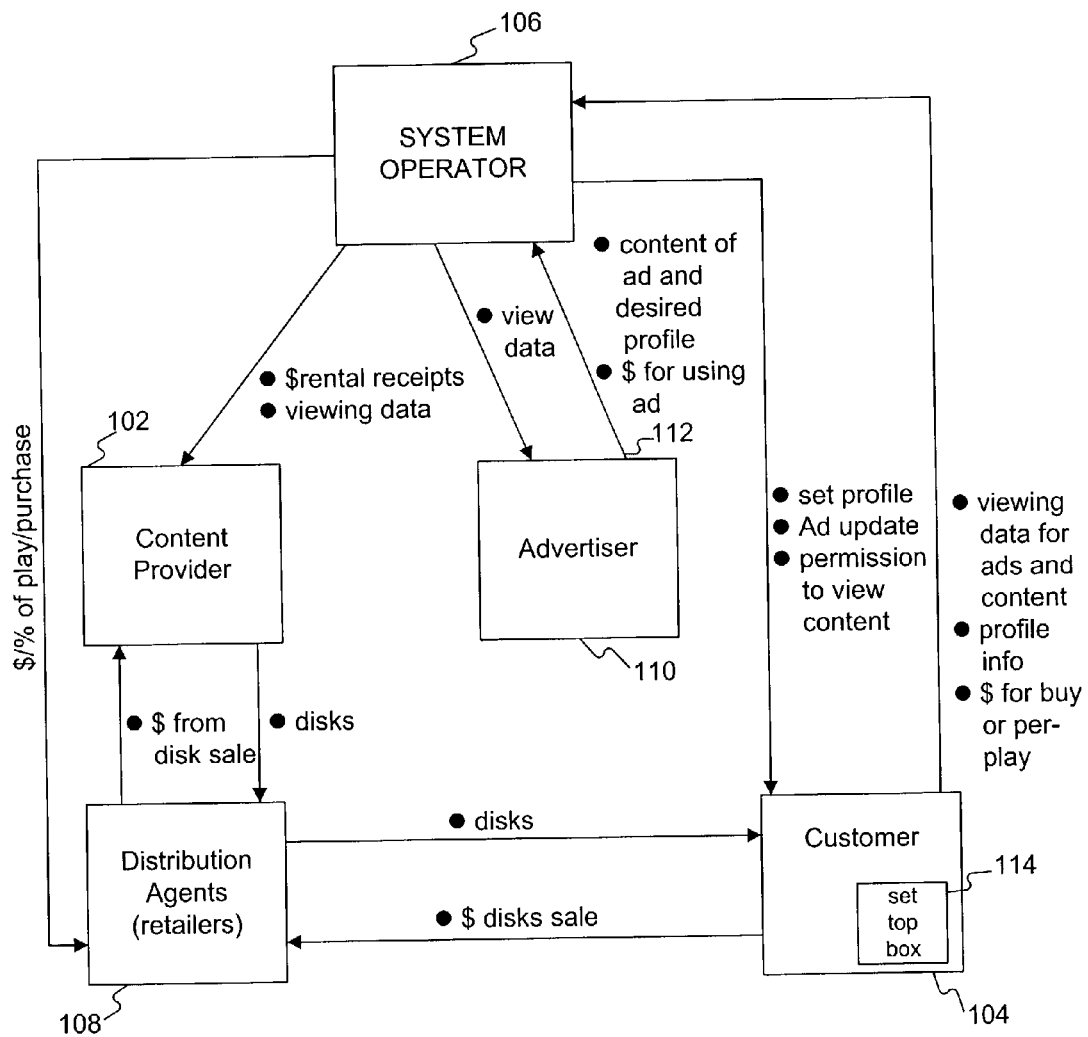
FIG. 1 is a block diagram showing a distribution model for distributing audiovisual content and advertising content to consumers.

As shown in FIG. 1, the system 100 comprises a content provider 102, a plurality of consumer locations 104, a distribution system operator 106, one or more distribution agents 108, and one or more advertisers 110. Customer locations would watch the distributed content on a device such as a set top box 114. System 100 additionally may contain numerous communications links between the various components of the system, as will be described.

Content provider 102 provides content (i.e. informational content such as shopping catalogs, video content such as movies or TV shows, or audio content such as songs or radio shows), via discs or other method to distribution agents. In turn, distribution agents 108, such as retailers, provide the discs to customers. Customers 104 may purchase the discs from distribution agents 108, or maintain a subscription for the continual update of discs. Customers then remit payment for the discs to distribution agents 108, who return a predetermined portion of the receipts to content provider 102. In addition, content providers 102 may distribute content directly to customers 104, in which case customer 104 would remit payment for the disc directly to content provider 102.

Furthermore, the content providers may widely distribute the content free of charge, in a protected format, such that the distribution system operator may control access to the content and charge for any presentation of the content, either on a pay-per-view basis, a one time fee, subscription or other basis. Preferably, the content is hardware protected, software encrypted, or both, to prevent unauthorized access to the content. The content may be hardware protected by distribution on proprietary discs which are not readable by commercially available hardware. Reading the disc then requires a proprietary set top box 114. In order to break receive enabling commands or keys necessary to unlock any encrypted content, a consumer would remit payment to the system operator.

Customer 104, then plays the distributed content. As the content is played, the box may also receive advertisements, either directly from system operator 106, or directly from advertisers 110. In addition, the advertisements may have been previously transmitted to the set top box and stored in a buffer. The advertisements may be inserted into the viewed content during viewing as is described below. The set top box may send information to the distribution agent, such as identification of the content viewed, and the identity of the distribution agent from whom the consumer received the content.

System operator then sends data regarding the viewings of advertisements, such as the number of viewings, and residential preference information to the advertiser. Such information allows advertiser 110 to modify its advertising approach (i.e. direct advertising campaigns to new preferences). Finally, advertiser 110 submits payment to the system operator.

System operator 106 may submit viewing data, and payment royalties or rental receipts to the content providers.

The content provider may also distribute audio/visual content for pre storage on the consumers set top box, so that it may be viewed or listened to at any time for a fee. Similarly, the content provider may transmit broadcasts of live events. Both forms of distribution may contain security to prevent consumers from circumventing payment for the content.

The content providers first distribute audio/visual content, including but not limited to information, music, television shows, and movies, to the consumer locations for storage. This content may be viewed at any convenient time by retrieval from its storage location by the consumer. The content providers may broadcast the content to the set top boxes for storage or, preferably, distribute the content via a secure storage medium. Traditional CDs and DVDs may be used; however, the storage capacity of traditional discs would result in the distribution of great quantities of such discs. In addition, it has become increasingly easy to pirate the content of such discs by ripping the contents from the disc, and decoding it using applications available over the Internet. Instead, optically altered DVDO's™ are preferably used to securely distribute the content.

Just as consumers will be able to play their shows at their convenience, advertisers will be able to tailor their broadcasting schedules to maximize the efficiency of advertising campaigns. The distributed content preferably contains insertion points in the data at strategic locations to provide space for advertisements. Similarly, the streaming live content may contain insertion points allowing advertisements to be placed at strategic locations. The advertisements are supplied via known methods (e.g. over the air, by direct broadcast satellite, internet, cable, or POTS) to set top boxes at the consumer locations (i.e., households) and pre-cached, such as in semiconductor memory or on a hard drive. Therefore, once a consumer selects a show for playing from either a live feed or pre-storage, the set top box will play the show, occasionally encountering insertion points in the encoded content. As it encounters these insertion points, it will place a pre-cached advertisement in the content for presentation to the consumer.

The system therefore provides a method for displaying advertisements at a user location. The method includes generating a customer preference containing user characteristics, displaying entertainment content at the user location, the entertainment content including insertion points for display of advertisements, transmitting a plurality of advertisements to the user location, selecting a subset of the transmitted advertisements based upon the customer preference, and displaying at least one of the selected advertisements during at least one of the insertion points.

Figure 2:
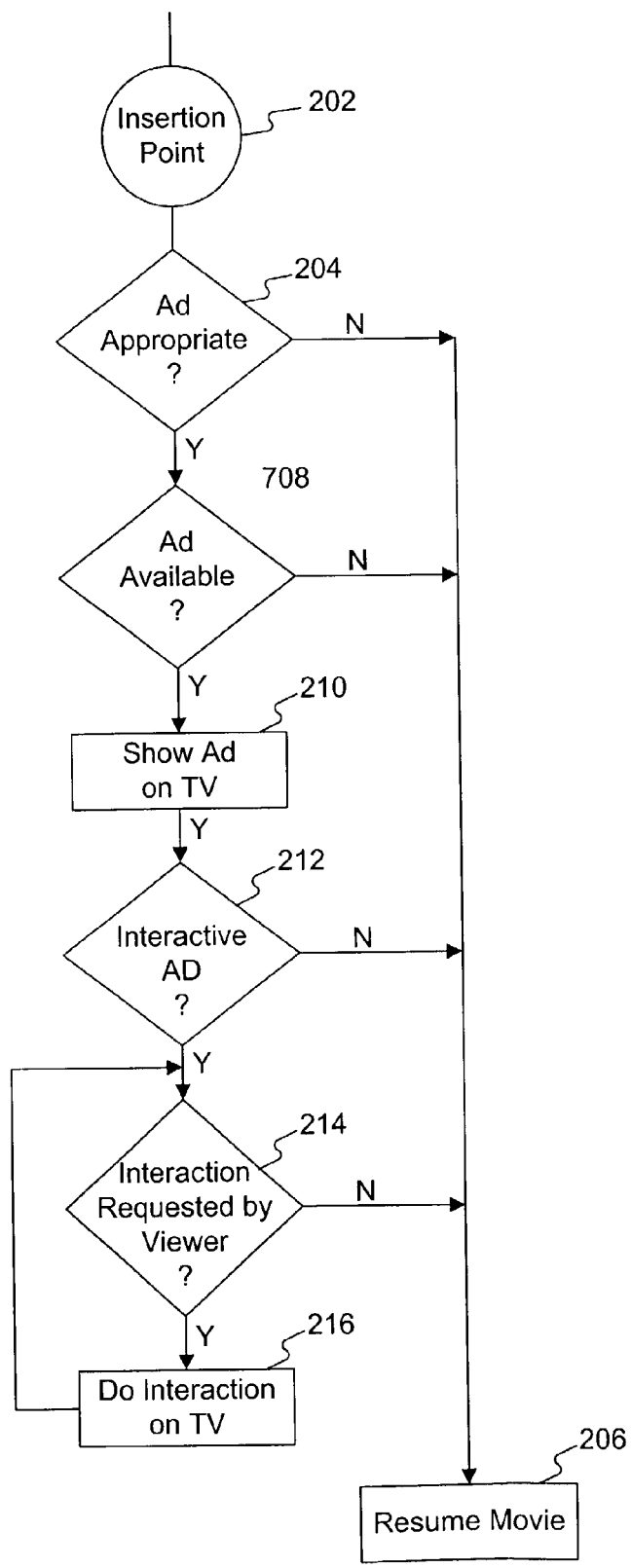
FIG. 2 shows a flowchart depicting the stages for inserting advertisements into viewed content.

FIG. 2 shows an exemplary method for integrating advertisements at insertion points in the viewed content. As the set top box of the consumer is receiving data for presentation to the viewer (either live feed, disc, or other source), it will occasionally encounter insertion points. An insertion point may be a set of bytes in the content representative of a command to insert an advertisement in the presented content. In one embodiment, the command may comprise a pointer to another storage location (i.e., to memory storage, a live feed, or to another disc or location on the disc).

Once the set top box encounters such a command (stage 202), it then determines whether an advertisement is appropriate (stage 204). An advertisement may be appropriate if the insertion point would be a logical place to insert an advertisement for the current residential preference at that customer household. In addition, an advertisement may be inappropriate if it would not make sense to advertise at that point in the content. An advertisement may not be appropriate if the customer has paid the higher rate for the ability to view the content free of advertisements. The residential preference of the customer may reside in the memory of the set top box, or, in one embodiment, may reside on a host computer of the content provider or video distribution system operator. If the set top box determines that an advertisement is not appropriate, it simply resumes playing the content (stage 206).

If, however, the insertion point is appropriate for a commercial, then the set top box must determine if an advertisement is available for insertion (stage 208). The advertisement may be stored on a hard drive, received via live feed, or received on a disc. In addition, the command to insert an advertisement may specify a location from which to retrieve the advertisement, or may allow the set top box to choose the advertisement based on a predefined algorithm, or based on residential preferences. If an advertisement is not available, the set top box may return to stage 206 to resume playing the content. In addition, the disc containing the content may contain a default advertisement or advertisements (such as to be chosen based on a customer preference), in addition to the insertion command, which may be played if no appropriate advertisement is available.

The set top box then plays the advertisement (stage 210). In addition, the advertisement may be an interactive advertisement (stage 212), in which case the advertisement will allow the user to interact via any known or later developed means (stage 214). In addition, a user may enter commands by inputting commands through a remote control, or communicating via the internet to the advertiser (stage 216).

As an additional level of security, the audio data at the insertion points may be omitted from the discs. The omitted portions of the audio track will be downloaded prior to viewing and seamlessly integrated into the audio, if the consumer properly remits payment and receives the proper key. Otherwise, the content will be incomplete, even if the encryption is cracked.

Once the set top box has completed presentation of the advertisement, and any interaction, the advertisement may contain a return command, commanding the set top box to resume presentation of the content. Such a command allows advertisements to be any length, providing greater flexibility to advertisers.

This distribution model allows advertisers the flexibility to tailor advertisements more efficiently to specific target audiences. For example, a set top box may be programmed to maintain residential preference information for a household, and to present advertisements that are targeted to the preferences of that residence. In particular, the box may contain a circuit device, which generates a customer preference containing characteristics of a device user. The box can be programmed to select advertisements for presentation on such criteria as the content currently being viewed (sports, or children's show), historical preferences of content, time of day, location of the box, including zip code or telephone area code, weather, time of year, or demographics of the region. In certain applications, the customer may be permitted to totally avoid the advertisements by paying an increased fee. In the alternative, a consumer could receive content for a reduced or no fee if they are willing to view additional advertisements.

Consistent with the present invention, the distributed content may be encrypted, either by hardware or software (or both). Encrypting the content, such that it may not be accessible to the customer, will allow system operator 106, to control access to the content. For example, hardware encryption, such as can be achieved by optically altering the discs (discussed below), will prevent the discs from being readable by technology currently accessible to consumers. In addition, software encryption will provide further control on access to the content, such that if hardware encryption is somehow broken, viewing the content will still require the user to break the software controls. Such software encryption can use any no known or later developed method. Preferably, such a scheme would utilize time sensitive keys that will "expire" after a predetermined amount of time.

An example of a key scheme that may be used is one incorporating three separate, yet dependent keys. For example, a host associated with the content provider can generate a random number (Key A) and transmit it to the consumer's set top box. In addition, the content provider may, through the same or a different schedule, transmit an algorithm, randomly selected from a large number of algorithms (i.e., 3000), to the consumer's set top box. Another key, Key B may reside in the box, for example, in a circuit device. A circuit device within the box will perform the transmitted algorithm on received key A and stored key B. The result will be a third key, Key C. Key C will then be transmitted back to the content provider for comparison to a key stored at the content provider. If the keys match, an enable signal will be sent to the set top box to allow the viewing of the content. In certain applications, it may also be desirable to place a security code on the disc itself. For example, the first words stored on the disc may contain a security code which is oversampled a predetermined number of times.

Consistent with the invention, a user who has received content encoded with software key or keys, may request to view certain content. Upon the request, the box may transmit billing information to the central controller. The central controller may then charge the consumer's account on a rental, purchase, subscription or other basis, and transmit back an enabling command, allowing the set top box to decode and present the requested content.

This distribution scheme also maximizes benefit to the advertisers by providing greater distribution flexibility for advertisers. Ads can be streamed with content, or pre-cached for selection. In addition, by selecting the advertisements based on a customer preference, advertisers may analyze the variants to compare sell through for a product in various location. If any variant in the customer preference proves to be statistically significant in predicting which consumers will purchase the products, consumer preferences and advertisements may be easily modified to better target the audience. This can be done by a feedback loop, which provides data to the system operator or content provider regarding the consumer preferences and the times the advertisement was presented.

In addition, content providers will be able to charge advertisers directly for advertising. They may charge the advertiser using numerous schemes such as by auctioning advertising time to advertisers based on customer preferences, or by charging the advertisers according to a rate card (i.e., charging a flat rate for each time the ad is presented to a consumer). In addition, demand for advertising within a particular customer preference or demographic can be used to determine advertising rates.

Requiring the content provider to verify the key prior to sending an enabling command also allows the content provider to bill the consumer for the content demanded. In this way, the enabling key may only be transmitted to a consumer who is in good standing with his or her bill. The consumer may be billed on a subscription model (i.e., be billed a flat rate for a period of time), may be billed per viewing of each show, may purchase a show (for unlimited viewings), or other desired billing scheme. In addition, when billing by the number of presentations of an advertisement, the content provider will have the flexibility to bill an advertiser at discounted rates for a large volume of presentations.

The keys and billing information may be sent via any communication means such as a modem, internet connection, telephone line, cable, or other means. In addition, in one embodiment, the set top box may contain a credit card or smart card reader for the recording and transmission of payment information.

In addition, the content provider may bill a customer a higher amount for a subscription to view the audio/visual content without advertisements.

Apparatus consistent with the present invention, provides hardware security for the distributed content. The distributed discs may be optically altered DVD's or CD's, (DVDO™). A DVDO is an optically-altered physical medium, which is not readable by currently available consumer players. Such a disc is described in more detail in the above-referenced provisional applications. Consistent with the present invention, an Optically Altered DVD (DVDO™ or DVDOA™) provides content protection in lieu of or in addition to other DRM schemes.

For example, one or more intrinsic optical changes may be made to traditional CD (780 nm) and/or DVD (650/635 nm) read technologies to render the reading of DVDO or optically altered CD (CDO™ or CDOA™ herein referred to as DVDO) impossible by commercially available readers Thus for videos, music, and other content, provided via physically delivered media, a DVDO player is required.

A disc is generally composed of at least two layers, a transmissive outer layer covering a reflective inner data layer. Discs are pressed in this format during the manufacturing process. A typical disc is 1.2 millimeters thick. Currently, the outer transmissive layer on a CD is 1.2 millimeters thick. In addition, for a typical DVD, the transmissive layer is 0.6 millimeters thick, such that the reflective data layer is located in the center of the disc, approximately 0.6 millimeters from either surface. Details of conventional DVD discs are set forth in the DVD-Video Format Book Specification, Version 1.11 published in March 1999 by Toshiba Corporation on behalf of the DVD Forum.

In order to read either CD's or DVD's, an optical reader directs a laser through the transmissive layer, focused on the reflective data layer. Modern technology requires the ability to focus the layer at precisely the depth of the reflective layer, in order to reduce bit error rates.

Consistent with the present invention, a disc is provided in which the inner reflective data layer is closer to the surface of the disc. For example, the transmissive outer layer of the disc may be reduced in thickness from 1.2 mm (for a CD), and from 0.6 mm (for a DVD) to a lesser thickness such that conventional readers are incapable of focusing on the reflective layer. By reducing the thickness of the transmissive layer, the reflective data layer of the disc is brought closer to the optical reader. Especially if used in a reader or player with short wavelength laser diodes, this allows for additional data to be encoded on a single disk (and together with improved error correction schemes), can greatly increase the storage capacity of discs. When used in combination with a larger buffer, the duty cycle, i.e. the time at which the diode is emitting the laser, may therefore be significantly reduced, therefore increasing the usable lifetime of the diode.

In order to read discs of this type, an optical reader will require a laser diode, which can focus on the reflective surface of the disc through a transmissive layer of less than 0.6 mm. To do this, the reader may include a Z-directional focus mechanism such as a drive mechanism capable of moving the disc tray closer to the laser diode or vice versa. In addition, the reader may simply place a laser diode closer to the surface of the disc than a conventional disc reader.

The DVDO may contain a thin coating of material having a high transmissivity at 400-410 nm and low transmissivity at 635-650 nm allowing the proprietary player to drive a 635 lasers at a higher power to penetrate, but preventing commercially available DVD players from reading the disc. Using the higher transmissivity, thinner coatings, a lower power diode may be used to extend the usable life of the diode.

Instead of, or in addition to, reducing the thickness of the transmissive layer, the optical disc may instead be made thicker than conventional discs. This will also change the focal point at which the laser diode must focus to a point outside of the capabilities of conventional DVDs or CDs.

Finally, discs may provide a hardware security feature by incorporating a larger diameter than a conventional CD or DVD. Such a disc must be sufficiently large that they cannot be inserted and played in a conventional CD/DVD player which may accept discs in the range from about 125 mm to 300 mm.

In addition, a disc may be altered to include two reflective surfaces. The first may consist of a reflective layer for encoding content in a format consistent with and readable by conventional CD or DVD reader standards. The second side of the disc may comprise a reflective layer for encoding content in a format consistent with and readable by the proprietary optical readers consistent with a DVDO. This would allow distribution agents to distribute unencoded content for viewing by all consumers, while simultaneously distributing content which is unviewable without the proprietary reader.

In addition to being able to read DVDO's™, such a system may be contain the necessary optics to read from (and/or write to) conventional, legacy CD and DVD discs.

Figure 3:
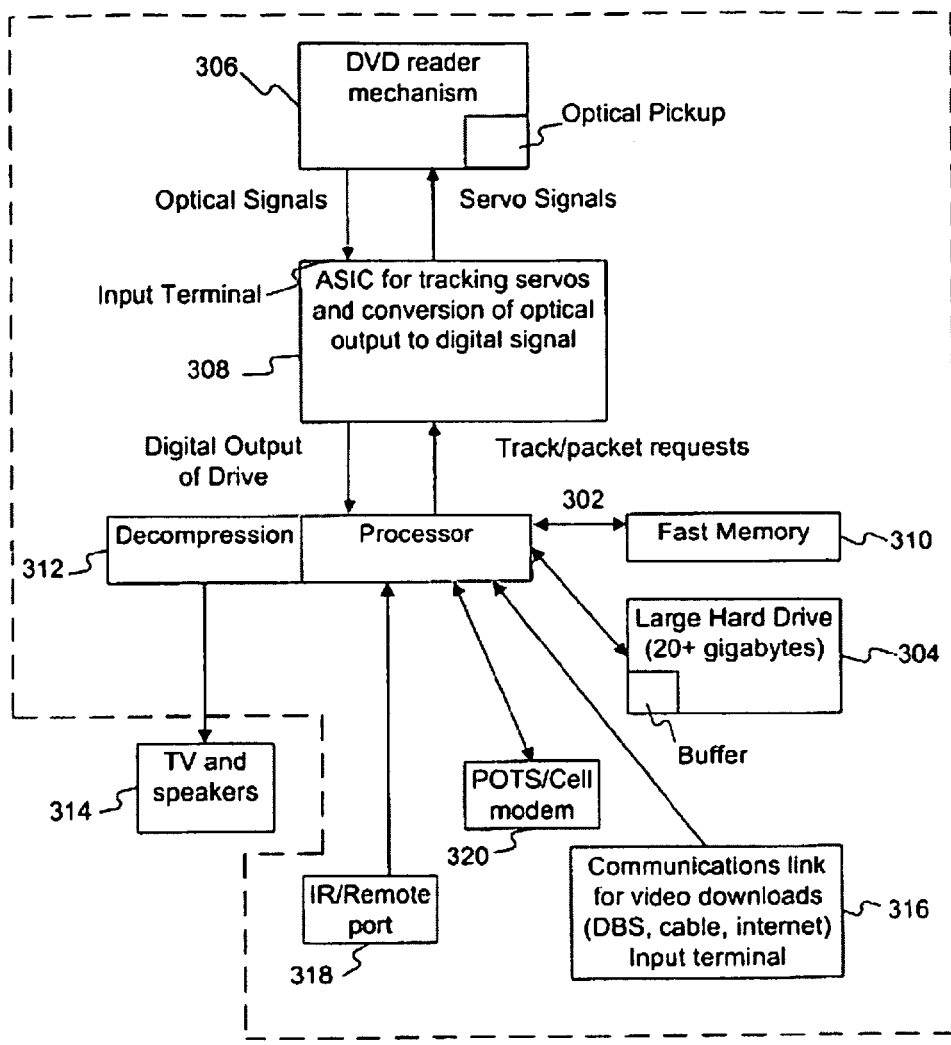
FIG. 3 is a block diagram of an optical reader.
Figure 4:
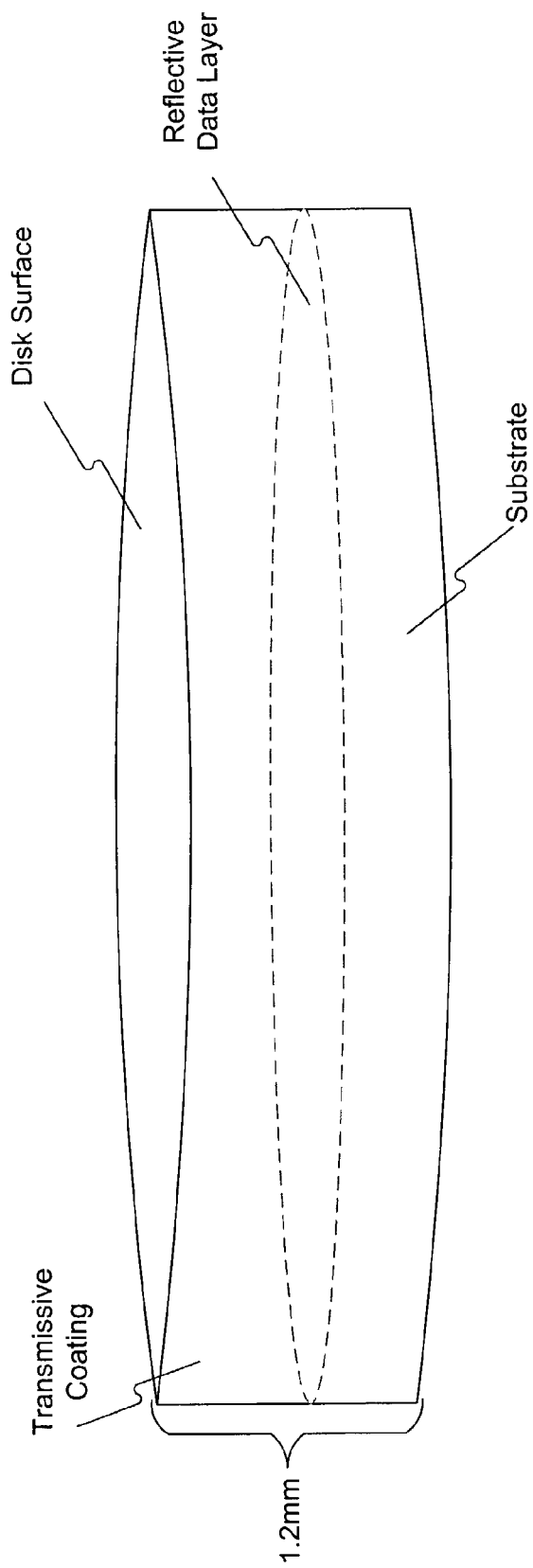
FIG. 4 is a block diagram showing a side view of a disc.
Figure 5:
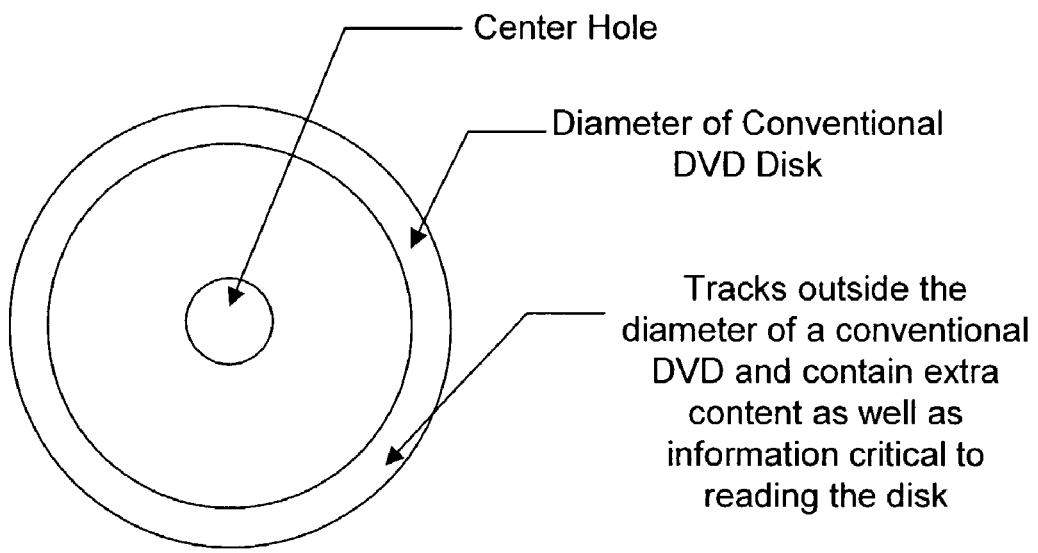
FIG. 5 is a diagram depicting a top-view of a disc.

FIG. 3 shows a block diagram of components in set top box 114. Set top box 114 includes a processor 302, a storage 304, a disc reader, drive mechanism 306, an integrated circuit 308, a fast memory 310, a decompressor 312, an output 314, and a communications channel 316. In addition, the system may include a remote unit port 318 and a communication interface 320. Consistent with the present invention, integrated circuit 308, which may be implemented as an ASIC may perform one or more of the functions listed above. The processor may perform the functions of any circuit devices described.

Disc reader mechanism 306 reads data from a disc, such as a DVD, CD, or optically altered CD or DVD (hereinafter a DVDOA or DVDO). In one embodiment, the disc contains the audiovisual content provided by a content provider. As the data is read by disc reader mechanism 306, integrated circuit 308 converts the optical output of disc reader 306 to a digital signal. This is then output to processor 302 and may be stored in memory, such as fast memory 310 or large storage 304. Alternatively, the output may be sent to decompressor 312 for decompression into output signals to be sent to TV and speakers 314.

In addition, communications channel 316 may be used to download live events from a content provider. Channel 316 may be a Direct Broadcast Satellite link (DBS), Cable link, or other communications connection. In addition, advertising content may be transmitted to set top box 300 via communications link 216, or a separate, yet similar communications channel (not shown). Once received, advertising information may be stored in hard drive 304. Storage 304 may be any storage medium, such as a hard drive or RAM. Storage 304 preferably is large in volume.

Modem 320 may be used as a back channel connection to the content provider such as for communicating a play request to the content provider, or for receiving billing information. In addition, modem 320 may be used to communicate billing information, to receive A codes, algorithms or enabling commands for security purposes. Finally, modem 320 may be used to communicate customer preference information between the set top box 300 and a content provider.

Set top box 114 includes an input circuit for receiving a permission signal. The circuit generates an enable signal, enabling a circuit device to process the data read by the optical pickup assembly into display signals. The functions of the input circuit may be incorporated into processor 302. Some or all of the functions of the circuit device may be incorporated in processor 302 or integrated circuit 308.

Consistent with the present invention, an box 114 may read a DVDO using an optical pickup assembly having a Z-directional focus mechanism, which can focus the laser at different depths. Consistent with the present invention an adjustable focal length system is utilized to read both legacy DVD and CD disks along with DVDO type disks. For example, apparatus 200 may include multiple optical pickup assemblies. One such assembly may be capable of reading DVDO's, and one or more may be capable of reading legacy CDs or DVDs.

Box 114 may also contain a terminal 117 for Emergency Feedback and Notification System (EFAN) compatibility. EFAN is described in U.S. patent application Ser. No. 09/990, 450, entitled "System and Method for Emergency Notification Content Delivery," filed Nov. 21, 2001.

Finally, set top box 114 may contain an interface for downloading to a remote unit all purchased or rented content, together with any necessary keys. The remote unit may be carried with a consumer away from the home and set top box.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for displaying advertisements at a user location, comprising:
    displaying entertainment content at the user location, the entertainment content including one or more insertion points;
    receiving a plurality of advertisements at the user location; and
    inserting, at the user location, at least one of the received plurality of advertisements into a first insertion point of the entertainment content, wherein the inserted at least one of the received plurality of advertisements is selected based on user preferences from a plurality of user locations and in accordance with a winning bid of an advertiser in an auction.

2. A method as recited in claim 1, further comprising:
    receiving a pre-recorded medium containing the entertainment content and storing the medium at the user location.

3. A method as recited in claim 2, further comprising:
    receiving entertainment content on a medium having a hardware security feature such that display of the entertainment content is possible only upon a player device including hardware compatible with the hardware security feature.

4. A method as recited in claim 3, further comprising:
    receiving the entertainment content on a medium that comprises a disk having a diameter greater than about 125 mm and less than 300 mm.

5. A method as recited in claim 3, further comprising:
    receiving the entertainment content on a medium that comprises a disk having data recorded on a reflective layer and an optically transmissive coating having a total transmission at 635 nm or less than a predetermined minimum transmission.

6. A method as recited in claim 1, further comprising:
    cachinge a subset of received advertisements at the user location.

7. A method as recited in claim 6, further comprising:
    selecting at least one of the cached advertisements based upon the user preferences,
    wherein the displaying at least one of the selected advertisements comprises displaying the selected cached advertisements.

8. A method as recited in claim 1, further comprising:
    receiving the entertainment content from a source remote from the user location.

9. A method as recited in claim 1, wherein:
    selecting a subset of the received advertisements based upon the user preferences comprises selecting a received advertisement based on the user preferences from a plurality of user locations in accordance with a purchase transaction by an advertiser.

10. The method of claim 1, wherein inserting an advertisement into the first insertion point is deemed appropriate based on a subscription level of the user.

11. The method of claim 10, further comprising:
    continuing display of the entertainment content without displaying an advertisement during a second insertion point, wherein the display of an advertisement during the second insertion point is deemed inappropriate based on the subscription level of a user.

12. A computer readable storage medium comprising instructions for displaying advertisements at a user location, the instructions comprising:

instructions to display entertainment content at the user location, the entertainment content including one or more insertion points;
instructions to receive a plurality of advertisements at the user location; and
instructions to insert, at the user location, at least one of the received plurality of advertisements into a first insertion point of the entertainment content, wherein the inserted at least one of the received plurality of advertisements is selected based on user preferences from a plurality of user locations and in accordance with a winning bid of an advertiser in an auction.

13. The computer readable medium of claim 12, the instructions further comprising:
instructions to receive a pre-recorded medium containing the entertainment content and storing the medium at the user location.

14. The computer readable medium of claim 13, the instructions further comprising:
instructions to receive entertainment content on a medium having a hardware security feature such that display of the entertainment content is possible only upon a player device including hardware compatible with the hardware security feature.

15. The computer readable medium of claim 12, the instructions further comprising:
instructions to cache a subset of received advertisements at the user location.

16. The computer readable medium of claim 15, the instructions further comprising:
instructions to select at least one of the cached advertisements based upon the user preferences; and
wherein the displaying at least one of the selected advertisements comprises displaying the selected cached advertisements.

17. The computer readable medium of claim 12, wherein insertion of an advertisement into the first insertion point is deemed appropriate based on a subscription level of the user.

18. The computer readable medium of claim 17, the instructions further comprising:
instructions to continue display of the entertainment content without displaying an advertisement during a second insertion point, wherein the display of an advertisement during the second insertion point is deemed inappropriate based on the subscription level of a user.

19. A system for displaying advertisements at a user location, the system comprising:
a receiver configured to receive a plurality of advertisements at the user location; and
a device configured to:
  display entertainment content at the user location, the entertainment content including one or more insertion points, and
  insert, at the user location, at least one of the received plurality of advertisements into a first insertion point of the entertainment content, wherein the inserted at least one of the received plurality of advertisements is selected based on user preferences from a plurality of user locations and in accordance with a winning bid of an advertiser in an auction.

20. The system of claim 19, wherein the receiver is further configured to receive a pre-recorded medium containing the entertainment content and storing the medium at the user location.

21. The system of claim 20, wherein the receiver is further configured to receive entertainment content on a medium having a hardware security feature such that display of the entertainment content is possible only upon a player device including hardware compatible with the hardware security feature.

22. The system of claim 19, further comprising:
a storage medium configured to cache a subset of received advertisements at the user location.

23. The system of claim 22, further comprising:
a computing device configured to select at least one of the cached advertisements based upon the user preferences; and
wherein the displaying at least one of the selected advertisements comprises displaying the selected cached advertisements.

24. The system of claim 19, wherein insertion of an advertisement into the first insertion point is deemed appropriate based on a subscription level of the user.

25. The system of claim 24, wherein the device is further configured to continue display of the entertainment content without displaying an advertisement during a second insertion point, wherein the display of an advertisement during the second insertion point is deemed inappropriate based on the subscription level of a user.

26. A system for displaying advertisements at a user location, the system comprising:
means for displaying entertainment content at the user location, the entertainment content including one or more insertion points;
means for receiving a plurality of advertisements at the user location; and
means for inserting, at the user location, the selected at least one of the received plurality of advertisements into a first insertion point of the entertainment content, wherein the inserted at least one of the received plurality of advertisements is selected based on user preferences from a plurality of user locations and in accordance with a winning bid of an advertiser in an auction.

27. The system of claim 26, wherein the means for receiving comprises a means for receiving a pre-recorded medium containing the entertainment content and storing the medium at the user location.

28. The system of claim 27, wherein the means for receiving comprises a means for receiving entertainment content on a medium having a hardware security feature such that display of the entertainment content is possible only upon a player device including hardware compatible with the hardware security feature.

29. The system of claim 26, further comprising:
means for caching a subset of received advertisements at the user location.

30. The system of claim 29, further comprising:
means for selecting at least one of the cached advertisements based upon the user preferences; and
wherein the displaying at least one of the selected advertisements comprises displaying the selected cached advertisements.

31. The system of claim 26, wherein insertion of an advertisement into the first insertion point is deemed appropriate based on a subscription level of the user.

32. The system of claim 31, further comprising:
means for continuing display of the entertainment content without displaying an advertisement during a second insertion point, wherein the display of an advertisement during the second insertion point is deemed inappropriate based on the subscription level of a user.

* * * * *

UNITED STATES PATENT AND TRADEMARK OFFICE
CERTIFICATE OF CORRECTION

| | |
|---|---|
| PATENT NO. | : 8,112,311 B2 |
| APPLICATION NO. | : 10/035172 |
| DATED | : February 7, 2012 |
| INVENTOR(S) | : Hunter et al. |

It is certified that error appears in the above-identified patent and that said Letters Patent is hereby corrected as shown below:

Title Page 4, item (56), under "Other Publications", in Column 2, Line 2, delete "um" and insert -- μm --.

Title Page 4, item (56), under "Other Publications", in Column 2, Line 7, delete "Videodics" and insert -- Videodisc --.

Title Page 4, item (56), under "Other Publications", in Column 2, Line 10, delete "um" and insert -- μm --.

Title Page 4, item (56), under "Other Publications", in Column 2, Line 11, delete "regenertively" and insert -- regeneratively --.

Title Page 5, item (56), under "Other Publications", in Column 1, Line 1, delete "filed Dec. 7 1999," and insert -- filed on Dec. 7 1999, --.

Title Page 5, item (56), under "Other Publications", in Column 1, Lines 6-7, delete "contents/_PressReleases" and insert -- contents/PressReleases --.

Title Page 5, item (56), under "Other Publications", in Column 1, Line 38, delete "dll?p.=hd" and insert -- dll?page=hd --.

Title Page 5, item (56), under "Other Publications", in Column 1, Line 56, delete ".dII?page..." and insert -- .dll?page... --.

Title Page 5, item (56), under "Other Publications", in Column 1, Line 67, delete "www.adamsl.com" and insert -- www.adams1.com --.

Title Page 5, item (56), under "Other Publications", in Column 2, Line 16, delete "en/ whatsplaying" and insert -- en/whatsplaying --.

<div style="text-align:center">
Signed and Sealed this
Eleventh Day of September, 2012

David J. Kappos
*Director of the United States Patent and Trademark Office*
</div>

CERTIFICATE OF CORRECTION (continued)
U.S. Pat. No. 8,112,311 B2

Title Page 5, item (56), under "Other Publications", in Column 2, Line 19, delete "What'Playing" and insert -- What's Playing --.

Title Page 5, item (56), under "Other Publications", in Column 2, Line 20, delete "en/ whatsplaying" and insert -- en/whatsplaying --.

Title Page 5, item (56), under "Other Publications", in Column 2, Line 30, delete ".comtentproviders." and insert -- .contentproviders. --.

Column 1, line 16, delete "35 U.S.C. 119(e)" and insert -- 35 U.S.C. § 119(e) --.

Column 1, lines 22-23, delete "35 U.S.C. 119(e)" and insert -- 35 U.S.C. § 119(e) --.

Column 1, line 29, delete "High Density" and insert -- High Density, --.

Column 10, line 39, in Claim 6, delete "cachinge" and insert -- caching --.

Column 10, line 56, in Claim 10, delete "The method of claim 1," and insert -- A method as recited in claim 1, --.

Column 10, line 59, in Claim 11, delete "The method of claim 10," and insert -- A method as recited in claim 10, --.